Dec. 26, 1961 J. W. ALOFS 3,014,403
PHOTOGRAPHIC AND PROJECTION SYSTEM AND PROCESS
Filed Dec. 28, 1953 6 Sheets-Sheet 1

INVENTOR.
JOHN W. ALOFS
BY
Frank E. Liverance, Jr.
ATTORNEY

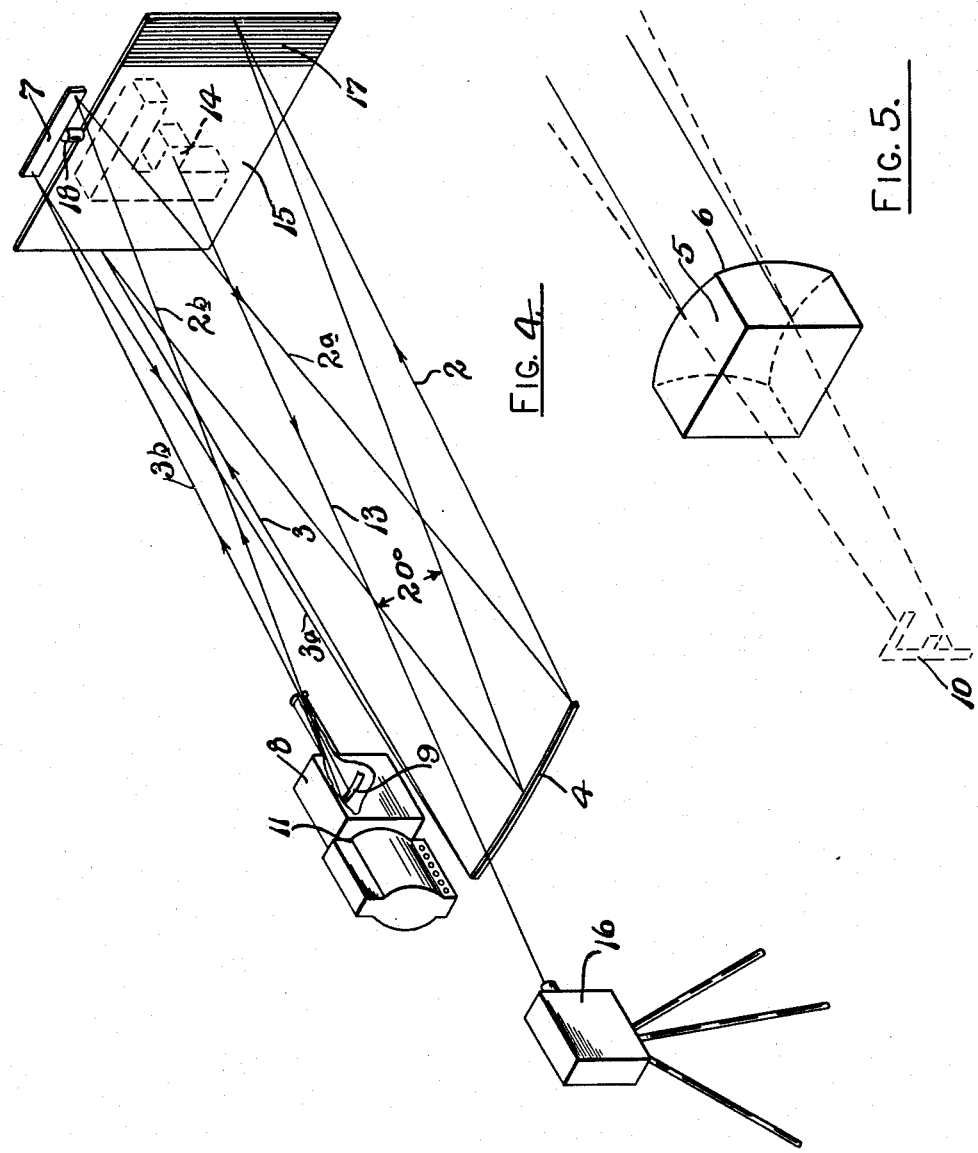

Dec. 26, 1961 J. W. ALOFS 3,014,403
PHOTOGRAPHIC AND PROJECTION SYSTEM AND PROCESS
Filed Dec. 28, 1953 6 Sheets-Sheet 3

*INVENTOR.*
JOHN W. ALOFS
BY
Frank E. Liverance, Jr.
ATTORNEY

Dec. 26, 1961 J. W. ALOFS 3,014,403
PHOTOGRAPHIC AND PROJECTION SYSTEM AND PROCESS
Filed Dec. 28, 1953 6 Sheets-Sheet 4
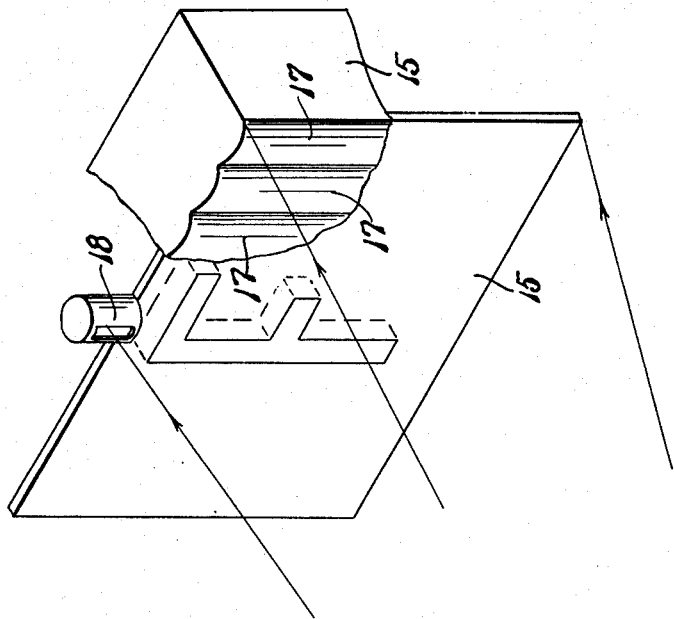
FIG. 7.
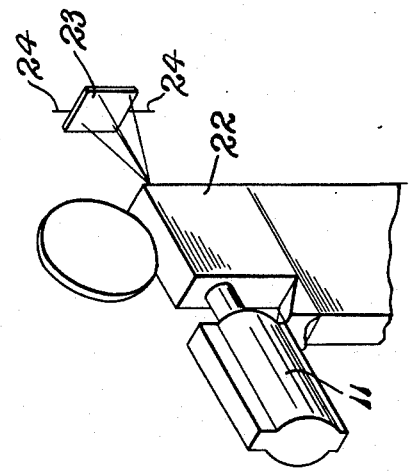
INVENTOR.
JOHN W. ALOFS
BY
Frank E. Liverance Jr.
ATTORNEY Dec. 26, 1961 J. W. ALOFS 3,014,403
PHOTOGRAPHIC AND PROJECTION SYSTEM AND PROCESS
Filed Dec. 28, 1953 6 Sheets-Sheet 5

INVENTOR.
JOHN W. ALOFS
BY Frank E. Liverance, Jr.
ATTORNEY

Dec. 26, 1961    J. W. ALOFS    3,014,403
PHOTOGRAPHIC AND PROJECTION SYSTEM AND PROCESS
Filed Dec. 28, 1953    6 Sheets-Sheet 6

INVENTOR.
JOHN W. ALOFS
BY
*Frank E. Liverance, Jr.*
ATTORNEY

United States Patent Office 3,014,403
Patented Dec. 26, 1961

3,014,403
PHOTOGRAPHIC AND PROJECTION SYSTEM AND PROCESS
John W. Alofs, 9953 S. Wentworth Ave., Chicago, Ill.
Filed Dec. 28, 1953, Ser. No. 400,401
2 Claims. (Cl. 88—16.6)

This invention is concerned with and directed to a novel method for photography and reproduction or projection of photographs to produce a stereoscopic effect, and apparatus for achieving the photography and reproduction of scenes in such a manner as will, in apparent effect, recreate in space, in the positions originally occupied by the photographed object or objects, a "ghost" or three-dimensional image of the original object or objects, having apparently the solidity and substance of such originals. Further, by the employment of the method of photographing and projecting the photograph utilizing a special screen, view-selecting devices are eliminated, and the projected image of the object or objects will appear to the viewer looking at them, as thus reproduced, exactly as the original would have appeared to such viewer, whatever may be the relative position he may occupy, before the screen within a sector about the screen center. The reproduced object or scene is reproduced to the viewer exactly as he would have seen it in its original aspect from the position at which he views the reproduction. Upon his changing positions in viewing the reproduction, he sees in the reproduced scene or object the exact views that he would of the original in any of the indefinite number of positions which may be occupied facing the reproduced scene. A three-dimensional image is reproduced which is a composite image of the very many and indefinite number of view points within such sector or angle, and an observer may change his position to any other position in the field included by such angle and observe a different aspect of the reproduced object, objects, image or scene, thus giving the effect of the solidity and substance of the original object, objects, or scene.

It is to be understood that in accordance with the principles of stereoscopic perception, the problem involved in photographically recording such a visual phenomenon and projecting the record upon a screen by means of a lantern slide projector or cinema projector, is that it is desirable that the sensation of stereoscopic vision shall be re-created for him as he views the photographic image which appears on the screen.

Stereoscopic perception is the visual sensation of depth experienced in human vision due to the fusion by the mind of the separate impressions of the two eyes. Such experience of depth perception depends upon a number of conditions. First, it is the separation of the eyes by a set distance, in human beings being approximately two and one-half inches. Such eye separation results in any object being seen from two different viewpoints, each unique and not interchangeable, as each eye sees the object or scene along a line of sight which is at an angle to that of the other eye. Thus there are portions of an object seen by one eye and not by the other.

If two identical cameras, occupying the position of the two eyes of an observer, are used to make photographs of the views seen by the two eyes of the observer, and the resulting photographs viewed by means of a stereoscope, each eye seeing the view as it saw it from its original position, the result will be a recreation for the observer of the perception of depth he experienced when viewing the scene directly. This is possible only because the stereoscope or other viewing device presents to each eye its proper view, excluding the other view. Thus, if two views were projected side by side on an ordinary screen it would be necessary to supply a viewing device to be used by the observer to select and present to each eye its proper view to the exclusion of the other. Devices performing such functions have been developed, and if there are a large number of observers each must be equipped therewith.

However, each observer views the scene as it was seen from the single positions originally occupied by the two cameras. The stereoscopic effect presented is that contributed by two discrete views only, namely, those views seen by the two eyes when viewing the original object from a single head position. With my invention there is in effect photographed by a single camera the composite record of the views of an indefinite number of cameras, all within the included viewing sector or angle; and each of said views is finally reproduced so that whatever position an observer may occupy before the reproduced image, he receives the impression of the original object which a camera taking a picture would record from such position.

There is in effect re-created in space in the position originally occupied by objects, scenes or the like, what for lack of a better characterization may be termed a "ghost" or three-dimensional image of the original object, objects, scenes or the like, having apparently the solidity of the originals thereof, from any point at which its reproduction is viewed.

The method of photography and reproduction followed and the apparatus which is utilized therefor may be understood from the following description, in connection with the accompanying drawings, in which, FIG. 1 is a diagrammatic illustration and layout of the first step of the process followed for obtaining a desired picture in accordance with one of two alternate but equivalent systems for the stereoscopic photography and projection process which I have invented.

FIG. 4 is a diagrammatic illustration of the apparatus and method followed in photographing the final film which is to be obtained by the projection of the developed first film to said mirror back to said reflector array and thence to a special gathering screen, from which the rays of light comprising the composite image projected thereon by all the reflectors jointly are reflected to the second camera, the film of which when developed may be projected upon a projecting screen having the same structure as the first or gathering screen used.

FIG. 5 is a diagrammatic illustration showing the rays of light coming from the mirror back to a single reflector to reform its virtual image of the object therebehind, one for each reflector, and projected thence to the special gathering screen as an enlarged image of the object, said enlarged image being the contribution of the single reflector considered to the composite image formed thus by all reflectors jointly.

Figure 6:
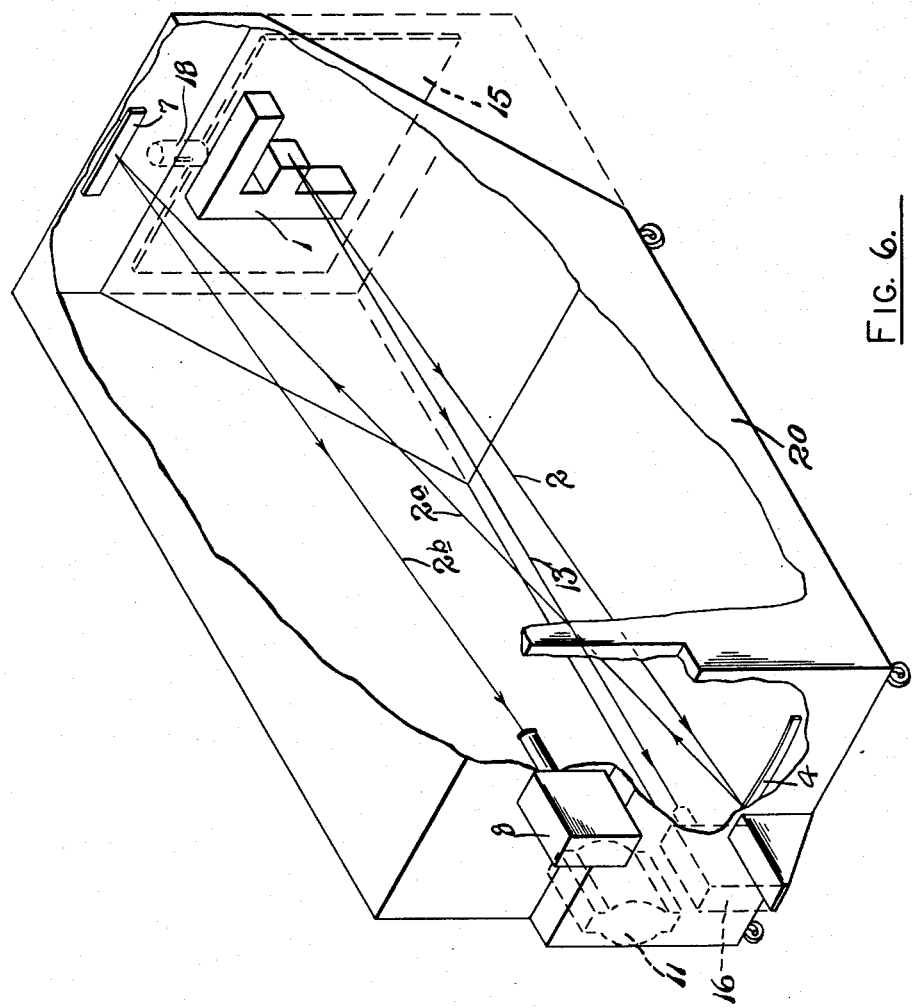

FIG. 6 is a perspective view illustrative of a way of using, in a single transportable unit, such cameras and screen as are utilized for a greater facility in carrying out the process in accordance with the first method illustrated in FIGS. 1 to 5 inclusive.

FIG. 7 is a diagrammatic illustration of the projection of the final film produced by the second camera onto a projection screen having the same structure as the gathering screen as viewed by an individual or audience and illustrating the registry of the projected picture onto the screen in proper relation.

Figure 8:
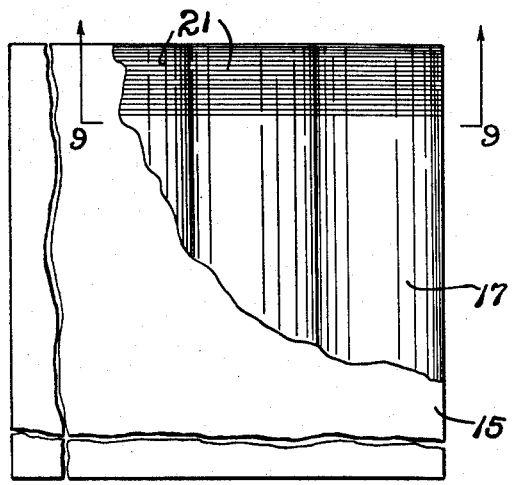

FIG. 8 is a fragmentary enlarged elevation of the special gathering and projecting screens.

Figure 9:
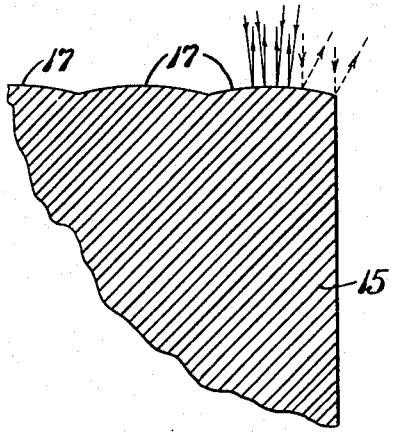

FIG. 9 is a fragmentary horizontal section through a portion of said screen, with a diagrammatic illustration of the reception of light rays and the reflection therefrom.

Figure 10:
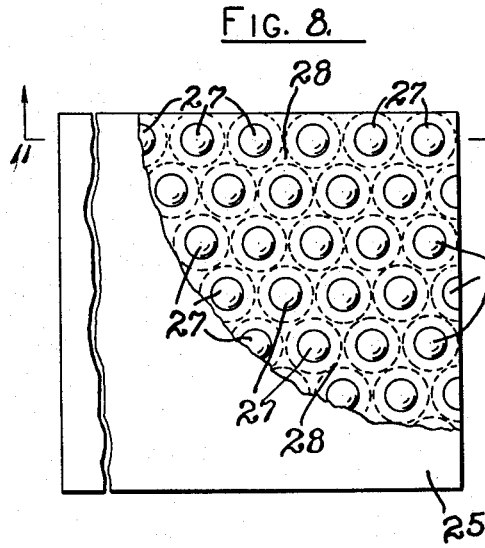

FIG. 10 is a fragmentary front elevation of an image-forming plate which in the alternate system of photography forms a composite stereoscopic image of the nature of that formed by the reflector array in the first method of photography.

Figure 11:
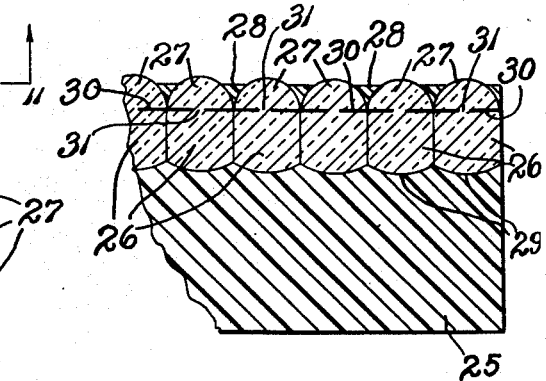

FIG. 11 is a horizontal section on the plane of line 11—11 of FIG. 10.

Figure 12:
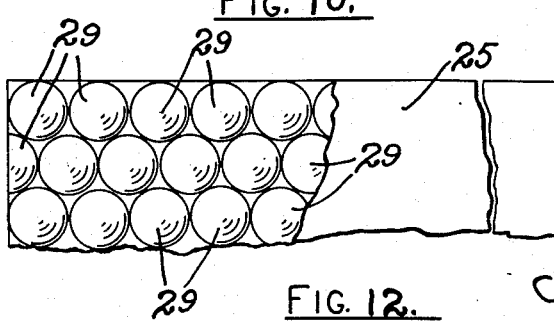

FIG. 12 is a rear elevation, with some parts broken away, of said image-forming plate.

Figure 1:
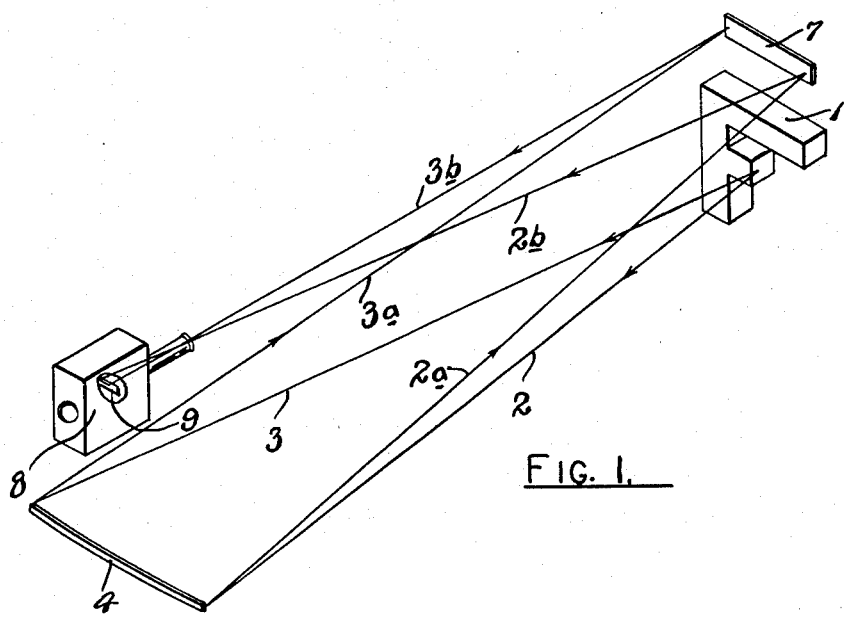
Figure 13:
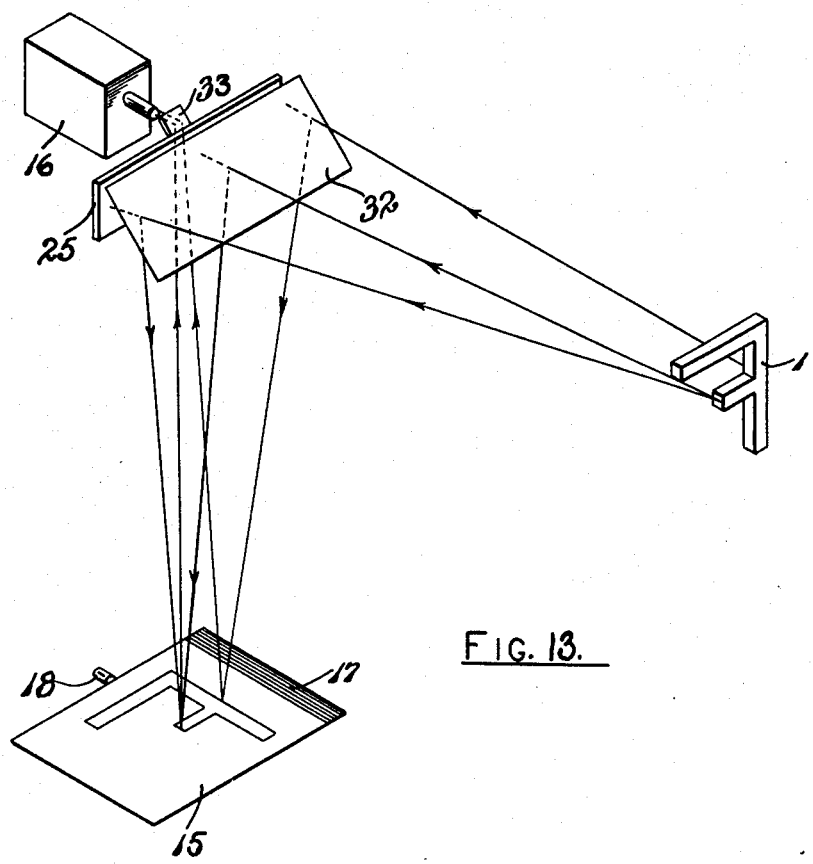

FIG. 13 is a diagrammatic illustration, similar essentially to FIG. 1 showing the manner in which, by means of a single camera, without the intervening rephotographing stage necessary in the first method, the final photographic transparency is obtained, which may subsequently be projected upon a projection screen identical in structure to that used in photographing it.

Figure 14:
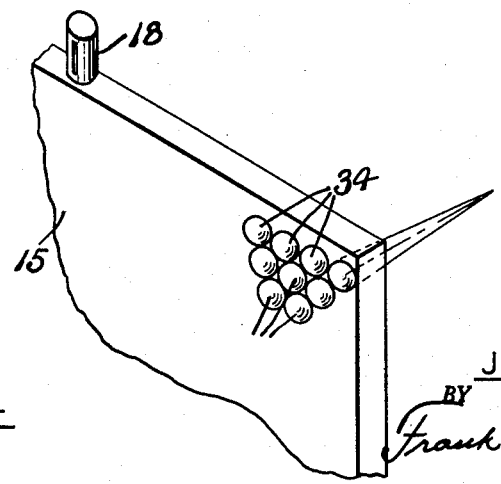

FIG. 14 is a fragmentary perspective view showing a gathering projection screen which may be used as an alternative for that of the structure illustrated in FIGS. 8 and 9.

Like reference characters refer to like parts in the different figures of the drawings.

In the stereoscopic system first to be described the object, indicated at 1, may consist of a single object or a plurality of them as, for example, a scene. From such object rays of light 2 and 3 emanating therefrom at all points are restricted, in the drawings, to the fan of rays emanating from a single point, and only those intercepted by the convex reflector array. Such array of convex reflectors is mounted upon a backing member 4 of sufficient rigidity which is of arcuate form, the radius of curvature of such backing member being approximately the distance that the convex reflectors are away from the object. These reflectors, which are convex spherical mirrors, are of small dimensions and large in number having spherical outer surfaces away from back support 4 and are spaced in a horizontal line. Each reproduces the object or scene to be photographed as an erect, reduced, virtual image in its focal plane, such scene being located in the vicinity of the arc center. The arc in practice may be 20 degrees or somewhat more. The reflectors indicated at 5, in number may typically be 169, and in each may be seen a complete minified view of the scene as it would be seen from the viewpoints occupied by such reflectors or mirrors. The rays emanating from the single point, shown in FIG. 1, of the object or scene and intercepted by the reflector array, are reflected back from the outer spherical surface 6 of each convex reflector to a plane mirror 7 tilted at such an angle to the convex surfaces at 6 of the spherical mirror array that, from it, there will be reflected views into a camera 8 located above the mirror array, and the entire series of views of the object will be recorded upon the film 9 which, as in motion picture cameras, is fed through the camera.

The illustration of the single rays 2 and 3 is repeated with respect to the indefinite number of light rays which come from all points of the object to all of the convex reflectors 5. Each of the convex reflectors 5 has a diameter of about .002 of its distance from the object or scene and its radius of curvature is about 5.7 times its diameter. Each spherical mirror "sees" a field of vision subtending an angle of about 20 degrees, and each compresses the entire scope of its field of vision into a small compressed view occupying the width of the mirror. The face of each spherical mirror subtends a solid angle of about 10 degrees. The image which each of the reflectors or spherical mirrors reflects to the plane mirror 7 appears as a virtual image back of the lens, as at 10 in FIG. 5.

The dimensions of the mirror 7 located in a position directly above the object or scene photographed must be such as to render the entire mirror array visible to the camera 8. Said plane mirror 7 may in practice be an assembly of, say, 13 smaller plane mirrors, each oriented at such angles as will reflect 13 of the 169 views presented by the convex reflectors, to the camera. These smaller plane mirrors may be arranged one above another in such manner as will present the 169 views to the camera as a compact grouping of 13 rows of 13 views, thus more economically utilizing the film area on which they are to be photographed. While not shown in the drawing for purposes of clarity, this arrangement represents a practical application of the method described.

Figure 3:
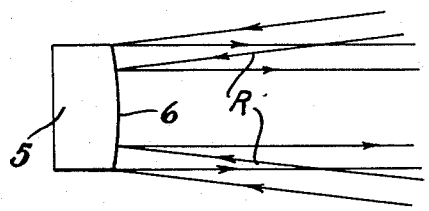
FIG. 3 is an elevation of one of said convex reflectors illustrating the rays from the object coming to the reflector and reflected as parallel rays proceeding from its virtual image to the reflecting mirror.
Figure 2:
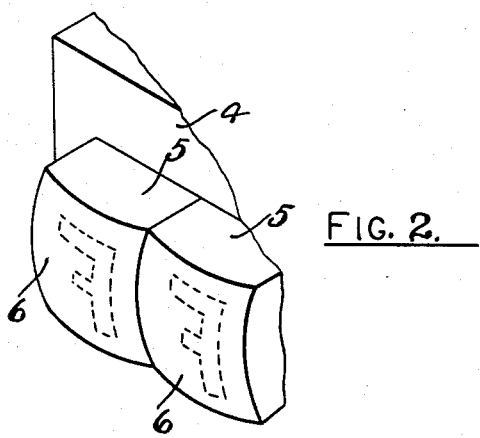
FIG. 2 is a fragmentary enlarged view, of convex reflectors, a plurality or array of which are used in horizontal alignment and disposed in the arc of a circle for directing the virtual images produced by said convex reflectors to a reflecting mirror which in turn reflects them to a camera.

The rays, indicated at R in FIG. 3, show them coming to the reflecting surface 6 of a spherical mirror 5 at such angles thereto that they are reflected as essentially parallel return rays to the plane mirror 7 and are therefrom reflected to the film 9 in the camera 8.

The picture which is photographed on the film 9 in the camera 8 is not the final picture. The camera 8 is a special camera in that it requires the us of wider film than is used in conventional motion pictures and has a lens of long focal length. Also it can be used in the second phase of the photographic stage as a projector by providing it with a lamphouse, as shown at 11, in FIG. 4.

The spherical mirror array used is constructed by mounting the convex reflectors in a row upon the arcuate support 4 which may be of steel or plastic, and the several convex reflectors 5 are cut in a square shape for conservation of space. The spherical mirrors function as follows: A virtual, erect, reduced image is formed in the focal plane of each reflector which in such reflectors are back of their surfaces, as at 10 in FIG. 3. It is a virtual image and can be seen only from the front of a reflector 5. Such image cannot be formed on a screen or on a film. A camera however can form a real image of the virtual image on its film. Thus the real images which the camera forms on its film are images of the convex reflectors but also images of the objects or scenes as seen from the viewpoints occupied by the reflectors.

The negative at 9 being developed, a positive transparency printed therefrom is placed in the camera 8 with the lamphouse 11 attached. With the camera in its original position it is now used as a projector. This reverses the performance. The images of the spherical reflectors 5 in the array are projected back to the plane mirror at 7 in FIG. 4 and from the plane mirror reflected back to their respective spherical mirrors where they originated, the image of each spherical mirror falling precisely on the mirror whence it originated. That is, the fan of rays bounded by rays 3b and 2b coming to the plane mirror 7 are reflected therefrom in the rays included between rays 3a and 2a to the spherical mirrors 5, and thence in the rays included between rays 3 and 2 to a screen 15 of special construction which has reflecting surfaces, the projected image 14 of the object which the screen 15 reflects having the rays of light 13 going therefrom to a second camera 16. Since the direction of the light is reversed, the part of the projection beam striking a given spherical mirror reforms the virtual image in the mirror, from which it is reflected to the special gathering or registering screen 15 as an image of the original object. Each of the spherical reflectors 5 in the convex reflector array casts its view of the original object onto the screen, the result being the re-creation of the original object as a three-dimensional image of such original object. The camera 16 used is a conventional camera, and photographs what comes thereto from the screen 15 as the final picture.

It is evident that a successful demonstration depends upon the accuracy with which the projected images of the spherical mirrors are registered upon the respective spherical mirrors of which they are the images.

The special gathering or registering screen 15 performs the function of converting or compressing the three-dimensional image formed by the array upon its surfaces into a two-dimensional or "flat" image which may be photographed by a conventional camera on ordinary film.

Such screen 15 has a surface which is made up of, typically, 280 cylindrical reflecting elements, indicated at 17, vertically positioned adjacent to each other. The surface of each of such elements is lightly scored with tiny horizontal ridges (FIG. 8) as indicated at 21 oriented perpendicular to the cylindrical axes of such elements. The front surfaces of the elements 17 are silvered for light reflecting. The horizontal ridges 21 on the elements 17 spread or fan out in vertical planes the light falling on each ridge, but at the same time to allow a ray falling on a single ridge to be reflected in its proper direction along horizontal planes. The function of each element 17 is to reflect to the recording camera 16 a compressed summation of all of the aspects of that elemental portion of the scene which is imaged thereon. Or, as may be alternately stated, each element reflects to the camera 16 all rays returning from the spherical mirror array consisting of the reflectors 5 which fall upon that element. The width of each element is such that it subtends an angle of typically 20 to 30 degrees with the axis of the element. The screen may be of any size but the number of elements must be fixed though proportional in size to that of the screen. The screen must be quite rigid.

When the three-dimensional image formed at the screen is to be photographed, a motion picture or still camera 16 is placed in such position that its optical axis strikes the screen perpendicularly and at such a distance that its visual field just includes the screen. To secure these factors of positioning of the camera and screen as well as of the associated spherical mirror array and the plane mirror, they may be fixed by setting up the component parts in an assembly on a rigid frame or dolly, a possible arrangement of which is shown at 20 in FIG. 6, on which the cameras may be also mounted or dismounted as desired. Such assembled apparatus with its parts in fixed relation is maneuverable as a unit.

It is to be understood that the gathering screen at 15, shown in dashed lines in FIG. 6, and also the lamphouse 11 and second camera 16 similarly shown, are absent when the objects or scene are photographed initially by the first camera 8, but are put in place for the second step of the procedure. Preferably, there will be a lighted slit in a member 18 immediately above the gathering screen 15 which is also photographed by the second camera 16 at the same time as the photographing of the scene displayed on the gathering screen 15, and on the same film as bears the image of the scene. The image of this lighted slit is recorded on an area of the film not occupied by the image of the scene. The purpose of this slit image is to provide a means for subsequently maintaining accurate registry of the picture on the projection screen when the finished film is to be exhibited. When the finished film is to be projected, another member corresponding in position and size to the member 18, is placed above the projection screen to detect or sense the projected image of the slit previously photographed. This sensing member consists of a pair of photo-electric cells in a housing similar to the member 18. In operation the projected image of the slit falls precisely between the cathodes of the cells. Any deviation from accurate registry of the projected picture on the projection screen at the same time results in a displacement of the slit image from its normal position between the photocell cathodes. The resulting incidence of light on either cathode produces an electrical current in the cathode so stimulated, which is used to control a mechanism at the projector which shifts the projection beam in the proper direction to correct the deviation. An indication of such regulating mechanism as shown in FIG. 7 diagrammatically, the rays of light providing the projected scene from the projector 22 being maintained in their paths by the diagrammatic regulating unit having the glass plate 23 interposed in the projection beam, rotatable about a vertical axis 24, along which axis 24 such rotation is given the glass plate 23 as may be required to correct any deviation of the projection beam.

The regulating mechanism in detail is not illustrated or described. Such regulating mechanism as to any novelty therein is properly a separate subject matter of invention and will not be disclosed herein, though I have such regulating mechanism automatic in its operation fully provided.

The alternative method of photographing makes use only of the final or second camera 16 so that the film produced therefrom fully developed may be used without further work thereon. In so doing, an image-forming device different from the previously described reflector array is provided, shown in FIGS. 10, 11 and 12.

In the structure illustrated in FIGS. 10, 11 and 12, the support or backing plate 25 of suitable material has at a face thereof a very large number of lens or mirror elements, preferably assembled in a rectangular plate, each having an inner part 26 and an outer part 27. The outer parts 27 of semi-spherical form are partially surrounded by an opaque plastic material 28, preferably, which encircles all except a central exposed outer portion of each part 27 as shown in FIG. 11. The inner ends of the inner members 26 have a spherical conformation as shown at 29. Such surfaces at 29 are silvered or otherwise equivalently covered with reflecting material. A thin opaque sheet 30 separates the inner and outer parts 26 and 27. At the centers of each of the outer parts 27, a circular opening 31 is made in sheet 30. In the use of this lens array (FIG. 13) it is disposed in a substantially vertical plane. Between it and the object 1 is a half-silvered mirror 32 extending downwardly and toward such object at an angle of 45 degrees to the array. The same gathering screen 15 with its reflecting rib surfaces at 17 is located below the half-silvered mirror 32, reflecting rays therefrom to a plain mirror 33 at the upper portion of and back of the lens array mounted on the support 25, to reflect the rays directly into camera 16 which is identical with the previously mentioned camera 16. The rays of light are partly reflected off and lost by the half-silvered mirror and partly transmitted to the lens array, being therefrom reflected back upon themselves to the half-silvered mirror 32 and thence downwardly to the gathering screen 15 and, therefrom, to the mirror 33 and thence to the camera 16.

With the system using the array shown in FIGS. 10 and 11, the said array performs the function of seeing the scene to be photographed from all necessary viewpoints and of forming a three-dimensional image thus accomplishing in one operation what the convex reflector array 4, the plane mirror 7, and the first and second cameras together in the previous system need two steps in the photographic stage to accomplish. It forms a three-dimensional image or scene directly upon the gathering screen without the intervening steps of photographing and projecting the separate views thereon.

Such array or image-forming plate is of two sheets of transparent material forming a mosaic of very small spherical lenses as at 27. It is of course to be understood that in effect a sandwich is produced of the outer members 27 and the inner members 26 with the opaque sheet 30 between them, such sandwich being cemented to the flat opaque plate 25. The refractive index of the material of which the so-called sandwich is made is about 1.5. The thickness of each of the two parts is equal to the radius of the curvature of the lenses embossed thereon, the lenses 27 and the lenses having the spherical surfaces 29. The outer sheet has one-half the thickness of the rear sheet. Since for each lens on the front sheet there is a corresponding lens on the rear sheet coaxial with the front lens, the thickness of the sandwich thus formed is three times the thickness of the radius of curvature of the front lens. The centers of curvature of both the outer and inner lenses thus fall on their meeting plane surfaces which have the thin opaque member or coating at 30 between them, which opaque coating has many small circular apertures 31, a single aperture being concentric with the axis of each lens pair. These apertures serve as stops, and are of such a diameter as will fix the focal length of the lens pair at a value equal to the sum of the radii of the component lenses of the pair.

It is to be understood that if a refractive index of about 1.96 is used in fabrication of the sheets, the lenses on each sheet may be equal in radius, making the thickness of the lens sandwich twice the radius of curvature of the lenses, and the focal length of the front lenses equal to the diameter of the sphere formed by their contact. It will be understood from this that such an image-forming plate might be made with small beads of such transparent material embedded in a reflective material as a support, or having their anterior surfaces coated with such material.

The function and operation is as follows: Light from an object, like the object 1 of FIG. 13, enters the front surface of each lens pair and an image of the object is formed on the spherical reflecting surface at 29 on the rear of each pair of lenses. This image is reflected back out of the front surface, along the same lightpaths as it entered, and another image of the object is formed in the same position as the object itself, erect and of the same size as the object. Each lens pair in the plate performs the same operation, and the result is a three-dimensional image of the original object superimposed upon the object itself. The function of the lens array may be further explained as follows: Rays of light emanating from any single point on the object enter the front surface of the lenses on the plate 25, in the form of tiny cylindrical beams of essentially parallel rays. When such a cylindrical beam of rays reaches the surface of any one of these lenses, all rays proceed to a common focal point on the spherical reflective surface at the rear. Each ray striking the reflective rear surface is reflected at an angle equal to its angle of incidence upon the rear surface, and emerges from the lens in a direction parallel to its direction upon entry. Since each ray composing the original beam behaves in a similar manner, the rays emerging from the lens form a beam of parallel rays similar to the beam which entered the lens. This emerging beam proceeds along the same course as that of the original entering beam, back to the point on the original object whence it emanated. Since for each of the large number of lenses in the plate there is a returning beam, an image of that point is formed by the intersection of these returning beams, coinciding with the point itself. Since for each point on the object the effect is duplicated, a complete three-dimensional image of the object is formed, superimposed on the object itself.

Of course such image superimposed on the object itself is useless unless the image can be diverted to be seen and photographed. This is accomplished by the half-silvered mirror 32 positioned as described so that the three-dimensional image is reflected downward onto the registering or gathering screen 15 similar to that used in the previously described system.

The plate may be made of any length horizontally, and the number of viewpoints from which the object is thus seen and recreated, may be increased indefinitely.

Such three-dimensional image registered on the screen 15 cannot be observed as such. If an ordinary paper screen is used instead of the special screen 15 with its reflecting surfaces 17, an image may be seen, but the effect will not be three-dimensional, but, instead, that of a smeary, flat image. If the observer assumes a position behind the image, looking back at the lens array he will see the three-dimensional image, but the impression will be that the scene has been turned inside out, distant objects appearing near and near objects behind them, with convex surfaces appearing concave. Such effect is corrected when the scene is reproduced by projection.

The lens-carrying plate may be made in any suitable dimensions. In application it is made of such a length as will subtend an angle of 20 degrees or more about the center of the scene or object, the actual length depending on the distance of the object to be photographed and on the angular field of vision desired. The image registered on the gathering or registering screen is reversed in its reflection by the half-silvered mirror. If one looked at the image on the screen lettering would appear backwards. A conventional mirror, as the mirror 33, set at an angle of 45 degrees to the surface of the screen 15, corrects such condition.

Instead of the projecting screen having the parallel vertical cylindrical surfaces 17 on the screen backing member 15, there may be substituted therefor, upon the same backing a plurality of small reflecting spherical surfaces as at 34 in FIG. 14. This is desirable as an alternative structure to the screen having parallel elongated reflecting surfaces 17. Moreover, a gathering or registering screen of like structure as that illustrated in FIG. 14 must be used in photographing, or the picture projected upon such a projection screen would be unintelligible. Whatever structure of the registering screen is used, such also must be the structure of the projection screen.

With my invention, one main object is to record all of the viewpoints of an object on a single photograph. In the first form or embodiment of the invention described, the picture taken with the first camera 8 is of the reflector array 4 and also of the images from all convex reflectors in the array. The photograph thus obtained put back in the first camera, in precisely the same position that it had when the picture was taken, is projected from said first camera (FIG. 4) to the reflector array and therefrom to the registering or gathering screen 17, retracting in reverse the paths taken by the light rays followed in taking the picture. As thus accurately retraced, the image from each viewpoint of the several reflectors of the reflector array thus re-appears in the respective reflectors in the array. However, such reflectors are merely reflectors, and the reflections must continue, re-tracing their original paths between the array and object to pass through the same points in space occupied by the corresponding points on the original object. Accordingly, a "ghost" or replica of the original object is created in the position of the original object.

If an ordinary plain white screen should be placed in the position of the original object an image of such original object would appear on the screen. But it would show as a flat smeared image because only the points of the original object which falls in the plane of the screen would be in proper focus. Removal of such ordinary flat screen results in a disappearance of the image. This is because, while the different rays may have passed through the original points on the object, they also pass on, there being nothing to obstruct their passage. The "ghost," image or replica cannot be seen from the position of the reflector array as the eyes cannot see rays going away but only those coming to the eyes. One could see fragmentary portions of the "ghost" image or replica by looking toward the reflector array from a position behind that occupied by the original object, but see only such portions as were in line with the eye and the reflector array.

The special registering or gathering screen 17 located in the original position of the object has coming to it rays from each reflector in the array in all directions. A consideration of the action at one reflective element of the registering screen will state what happens to each of them. A cylindrical reflector element of the registering screen has striking it certain rays which will be reflected from its surface in the direction of the second camera 16. That is, of the indefinite exceedingly large number of rays striking a particular point on the surface of the cylindrical element on the reflector or gathering screen at all angles of incidence, only a few of them are reflected in a direction so as to strike against the second camera lens. The rays entering the second camera lens from such element of the gathering or registering screens are only those which are included within a band of essentially parallel rays proceeding from such gathering screen cylindrical elements to the camera lens.

Each of the elements of the registering screen thus selects or gathers from rays striking it at all possible angles of incidence, and reflects to the second camera lens a band of parallel rays from the many rays, and collimates the rays striking it into such parallel ray band. Accordingly, the three-dimensional "ghost" image or replica of the object created by the intersection of rays proceeding in all directions from each reflector in the reflector array is converted by the gathering screen into a two-dimensional presentation of the rays comprising the three-dimensional image.

It is this collection of image rays which is photographed by the second camera 16 on a flat final film or positive transparency. Such film or positive transparency is placed in the final projector, the ray paths being again reversed by projecting on to an identical or, it may be, the same screen. Such reversal with the light rays striking such final screen will cause the rays to come toward the eyes of the observer so that they may be seen. Such observer, substantially at the position of the reflector array, will see the "ghost" image, or replica of the object photographed as apparently at the initial position of the photographed object because the light rays come toward the eyes (not away from them), their earlier paths being traced in reverse.

In summary in order to present a stereoscopic reproduction of an object so as to exhibit a stereoscopic effect, not only from one viewing position but from an indefinite number of such positions in an angular field or sector, it is necessary that all the possible aspects or angles of view of the original object be presented in the reproduction. Views from all possible view points within the angle or sector must be provided and all such views must be photographically recorded.

It could be done, in theory, by setting up a very large number of cameras one, for example, at each of the reflectors of the reflector array described. This of course is a practical impossibility but if it could be done and a picture taken by all of the cameras simultaneously there would be recorded a large number of views of the object and sufficient for the purpose as seen from the positions of such cameras. Making a positive transparency of each of such views and placing them in projectors substituted one for each of the cameras used with the proper photographic view in each projector, and the projectors positioned to direct their projection of views back to the position of the original object, all the views would be superimposed on the object itself and be substantially if not entirely indistinguishable from such object. If instead of the original object being in place, there should be provided a screen of a nature which would turn all rays from the various projections back upon themselves, each ray back upon itself, an observer in line with any one of the projectors would see reproduced on the screen what would appear to be a similitude or replica of the original object as seen from that position. By moving laterally from right or left of any original position he would still see such replica from different angles, but in each exactly as the cameras did observe it from such different angles, seeing such object in solidity and substance before him even though actually it is merely a similitude, ghost, or replica of it.

Obviously it is impractical to use a camera, one for each of the very small reflectors of the reflector array. With my invention, for such very large number of cameras, impossible to use, a means of photographing a very large number of views of an object from all angles within an arc is attained on a single conventional film. Also such single conventional film is projected onto a screen of a special design, so that there is exhibited the image of the object as a three-dimensional reproduction of the object appearing from all angles viewed as the object itself would appear viewed from such angles.

In the second described embodiment of my invention, it is not necessary to first photograph and project the several images formed and photograph again a second time to provide a flat two-dimensional film of the projection from the first photograph to the gathering screen. The potential three-dimensional replica is produced continuously by the image forming plate shown in FIGS. 4, 10 and 11. Each very small lens pair of the plate acts as a camera. An image is formed of the object at the rear surface 29 of the rear member of each lens pair. Such rear surface being silvered the image formed is reflected out of the lens pair which thus acts as a projector. Each lens pair acts as an individual camera and projector.

A potential three-dimensional replica or "ghost" is formed, though invisible from the position of the image forming plate, and projected and directed to the gathering screen 17, for recording on a conventional film as a two-dimensional photograph. This requires the use of the gathering screen which acts to code or rearrange the rays constituting the three-dimensional ghost or replica in a way that the camera 16 can record all of them on an ordinary flat film and still preserve the stereoscopic rays as recorded.

Projection of the transparency which is made is simply a reverse process. The projection screen used is identical with the gathering screen and decodes and re-orients the rays in their proper direction so that the three-dimensional replica is visible to observers facing the screen.

It may be thus seen that in both methods followed in obtaining the three-dimensional image or replica of an object in space, use is made of a multiplicity of image forming devices each of which will form an image of an object, and the rays of light from such image are directed in a manner that they can be visually observed and, because of such visual observation possibility, may be recorded.

It is to be understood that the invention is not restricted solely to three-dimensional photographing of an object or objects for projection upon a screen so that there appears in space the object or objects as they were initially in a substantially undistinguishable replica thereof. Another object of the invention is to provide such replica of a three-dimensional object in space solely for visual perception. With such visual perception, the eyes of viewers may see a replica of an object or objects in space directly, and the invention may be utilized in advertising and for similar purposes without photographing and screen producing.

The invention is defined in the appended claims and is to be considered comprehensive of all forms of structure coming within their scope.

I claim:

1. Apparatus for producing an aerial three-dimensional image of an object, comprising: reflective image forming means including an array of lens elements assembled on a flat support, each element having a spherical front surface and a reflective, spherical rear surface; an adequately illuminated object positioned before the front surfaces of said lens elements so as to emanate light rays of relatively high intensity toward said lens elements; said spherical surfaces being concentric and having radii of curvature so related to each other by the refractive index of the composing material as will cause an image of said adequately illuminated object positioned before the front surface to be formed on the reflective rear surface, and thence to be reflected back through the front surface as a real, erect, secondary image, of the same size as, and in the same position as the original object; said light rays emanating from said illuminated object being of sufficiently high intensity whereby said lens elements when functioning jointly form an image visible to the human eye and in the position of the original object, which image is a composite of the secondary image formed by each lens element individually, and which image, by virtue of the spatial separation of each lens element from each other lens element, is a composite of all the view points of the object from the positions of each lens element in the array, and therefore a three-dimensional image, a half-silvered mirror positioned between said image-forming means and the object so that light rays may pass from the object through said mirror to said image forming means; and said mirror positioned at an angle for diverting said secondary images away from the position of the object to a position for viewing or photographic purposes.

2. A method for producing an aerial three-dimensional image of an object, comprising: providing a reflective image forming means including an array of lens elements assembled on a flat support, each element having a spherical front surface and a reflective, spherical rear surface; said spherical surfaces being concentric and having radii of curvature so related to each other by the refractive index of the composing material as will cause an image of any adequately illuminated object positioned before the front surface to be formed on the reflective rear surface, and thence to be reflected back through the front surface as a real, erect, secondary image, of the same size as, and in the same position as the original object; positioning an adequately illuminated object before the front surfaces of said lens elements so as to emanate light rays of relative high intensity toward said lens elements; said lens elements when functioning jointly forming an image in the position of the original object, which image is a composite of the secondary images formed by each lens element individually, and which image, by virtue of the spatial separation of each lens element from each other lens element, is a composite of all the view points of the object from the positions of each lens element in the array, and therefore a three-dimensional image; providing a half-silvered mirror positioned between said image-forming means and the object so that light-rays may pass from the object through said mirror to said image forming means; and positioning said mirror at an angle for diverting said secondary images away from the position of the object to a position for viewing or photographic purposes.

References Cited in the file of this patent

UNITED STATES PATENTS

| | | |
|---|---|---|
| 1,550,880 | Clark | Aug. 25, 1925 |
| 1,882,648 | Kanolt | Oct. 11, 1932 |
| 1,883,290 | Ives | Oct. 18, 1932 |
| 1,919,561 | Kogel | July 25, 1933 |
| 1,935,471 | Kanolt | Nov. 14, 1933 |
| 1,970,311 | Ives | Aug. 14, 1934 |
| 1,972,019 | Kanolt | Aug. 28, 1934 |
| 2,011,932 | Ives | Aug. 20, 1935 |
| 2,045,119 | Carpenter | June 23, 1936 |
| 2,174,003 | Ives | Sept. 26, 1939 |
| 2,381,614 | Moller et al. | Aug. 7, 1945 |
| 2,550,350 | Henson | Apr. 24, 1951 |
| 2,727,427 | Jenkins | Dec. 20, 1955 |